United States Patent
Song et al.

(10) Patent No.: US 6,614,496 B1
(45) Date of Patent: Sep. 2, 2003

(54) TRANSFLECTIVE LIQUID CRYSTAL DISPLAY DEVICE HAVING REFLECTIVE ELECTRODE WITH A LIGHT-TRANSMITTING HOLE, SITUATED BELOW A TRANSPARENT ELECTRODE

(75) Inventors: In-Duk Song, Kyoungsangbuk-do (KR); Byung-Chul Ahn, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/629,103

(22) Filed: Jul. 31, 2000

(30) Foreign Application Priority Data

Jul. 31, 1999 (KR) ........................ 1999-31490

(51) Int. Cl.[7] ............................ G02F 1/1335
(52) U.S. Cl. ........................ 349/114; 349/113
(58) Field of Search ................. 349/113, 114

(56) References Cited

U.S. PATENT DOCUMENTS 6,195,140 B1 * 2/2001 Kubo et al. .................. 349/44

* cited by examiner

*Primary Examiner*—Toan Ton
*Assistant Examiner*—Andrew Schechter
(74) *Attorney, Agent, or Firm*—Birch, Stewart, Kolasch & Birch, LLP (57) ABSTRACT

The present invention discloses a transflective liquid crystal display device, including a first transparent substrate; a second transparent substrate having a color filter and spaced apart from the first transparent substrate; a liquid crystal layer interposed between the first and second transparent substrate; a gate electrode arranged on the first transparent substrate; a reflective electrode arranged on the transparent substrate and spaced apart from the gate electrode, the reflective electrode having a light transmitting hole, the light transmitting hole transmitting light; a first insulating layer arranged on the first transparent substrate while covering the gate electrode and the reflective electrode; a semiconductor layer having first and second ends and being arranged over the gate electrode; a source electrode overlapping the first end portion of the semiconductor layer; a drain electrodes spaced apart from the source electrode, overlapping the second end portion of the semiconductor; a second insulating layer covering the source and drain electrodes and having a first contact hole located on a predetermined portion of the drain electrode; a transparent electrode arranged over the reflective electrode and contacting the drain electrode through the first contact hole and covering a portion of the second insulating layer corresponding to the light transmitting hole; and backlight device supplying light toward the light transmitting hole.

15 Claims, 10 Drawing Sheets

TRANSFLECTIVE LIQUID CRYSTAL DISPLAY DEVICE HAVING REFLECTIVE ELECTRODE WITH A LIGHT-TRANSMITTING HOLE, SITUATED BELOW A TRANSPARENT ELECTRODE

CROSS REFERENCE

This application claims the benefit of Korean Patent Application No. 199931490, filed on Jul. 31, 1999, under 35 U.S.C. § 119, the entirety of which is hereby incorporated by reference.

BACKGROUND OF THE INVENTION

1. Field of the invention

The present invention relates to a liquid crystal display (LCD) device, and more particularly, to a transflective liquid crystal display device and a method of manufacturing the same.

2. Description of Related Art

In general, liquid crystal displays are divided into transmissive LCD devices and reflective LCD devices according to whether the display uses an internal or an outer light source.

A typical transmissive LCD device comprises a liquid crystal panel and a back light device. The liquid crystal panel includes upper and lower substrates with a liquid crystal layer interposed therebetween. The upper substrate has a color filter, and the lower substrate has a thin film transistor (TFT) as a switching element. An upper polarizer is arranged on the upper substrate of the liquid crystal panel, and a lower polarizer is arranged between the lower substrate of the liquid crystal panel and the backlight device.

Figure 1:
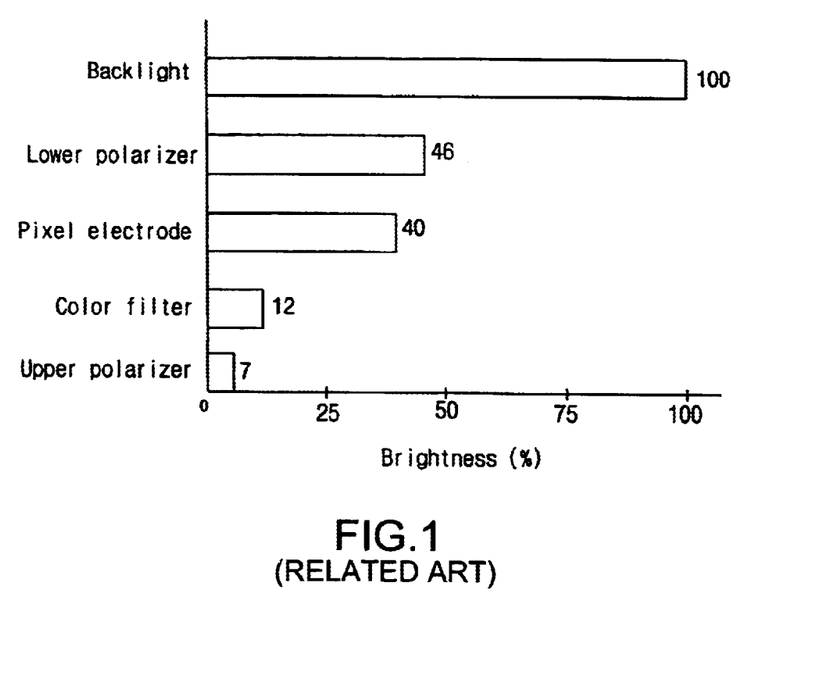
FIG. 1 is a graph illustrating a transmittance after light passes through each layer of a conventional liquid crystal display device.

At this time, the two polarizers have a transmittance of 45%, the two substrates have a transmittance of 94%, the TFT array and the pixel have a transmittance of 65%, and the color filter has a transmittance of 27%. respectively. Therefore, the transmisive LCD device gets to have about a transmittance of 7.4% as seen in FIG. 1 which shows a transmittance after light passes through each layers. For such a reason, the transmissive LCD device requires a high brightness and thus an electrical power consumption by the backlight device increases. In order to supply a sufficient power to the backlight device, a relatively heavy battery is employed, and there still exits a problem that the battery can not be used for a long time.

In order to overcome the problem described above, the reflective LCD has been developed. Since the reflective LCD device uses ambient light, it is easy to carry. Also, the reflective LCD device is superior in aperture ratio than the transmissive LCD device.

Figure 2:
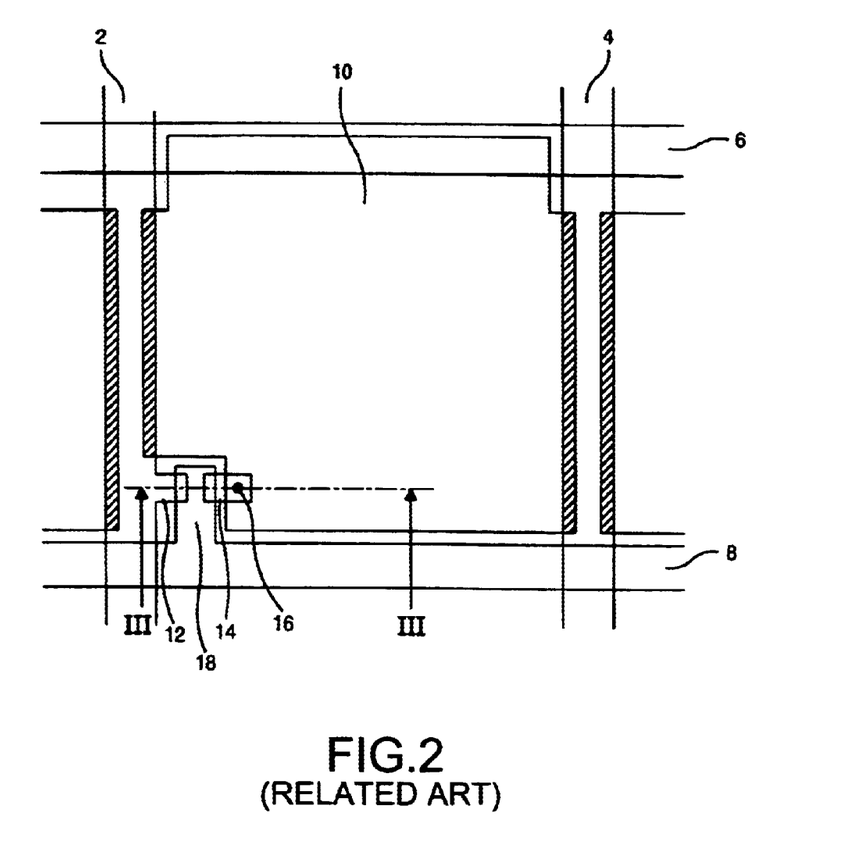
FIG. 2 is a plan view illustrating a conventional reflective liquid crystal display device.

FIG. 2 is a plan view illustrating a typical reflective LCD device. As shown in FIG. 2, the reflective LCD device includes gate lines 6 and 8 arranged in a transverse direction, data lines 2 and 4 arranged in a longitudinal direction perpendicular to the gate lines 6 and 8, and thin film transistors "S" (TFTs) near cross points of the gate line 8 and the data line 2. Each of the TFTs "S" has a gate electrode 18, a source electrode 12 and a drain electrode 14. The data electrode 18 extends from the data line 2, and the gate electrode 18 extends from the gate line 8. The reflective LCD device further includes reflective electrodes 10. The reflective electrode 10 is electrically connected with the drain electrode 14 through a contact hole 16 and is made of a metal having a good reflectance.

By the way, the reflective LCD device has a problem that it is affected by its surroundings. For example, the brightness of ambient light in an office differs largely from that of the outdoors. Also, even in the same location, the brightness of ambient light depends on the time of day (e.g., noon or dusk).

Figure 3:
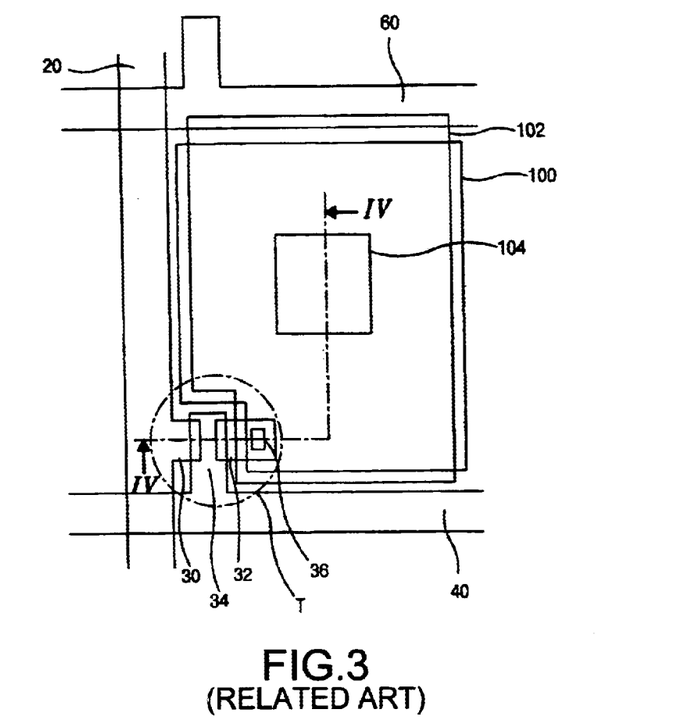
FIG. 3 is a plan view illustrating a conventional transflective liquid crystal display device.

In order to overcome the problem described above, a transflective LCD device has been developed. FIG. 3 shows a conventional transflective LCD device. As shown in FIG. 3, the conventional transflective LCD device includes gate lines 40 arranged in a transverse direction, data lines 20 arranged in a longitudinal direction perpendicular to the gate lines 40, thin film transistors "T" (TFFs) located near the cross points of the gate and data lines 40 and 20. Each of the TFTs "T" includes a gate electrode 34, a source electrode 30 and a drain electrode 32. The gate electrode 34 is extended from the gate line 40, and the source electrode 30 is extended from the data line 20. The conventional transflective LCD device further includes a reflective electrode 37 and a pixel electrode 39 connected with the drain electrode 32 through a contact hole 36. The reflective electrode 37 has a light transmitting hole 104 for transmitting light.

Figure 4A:
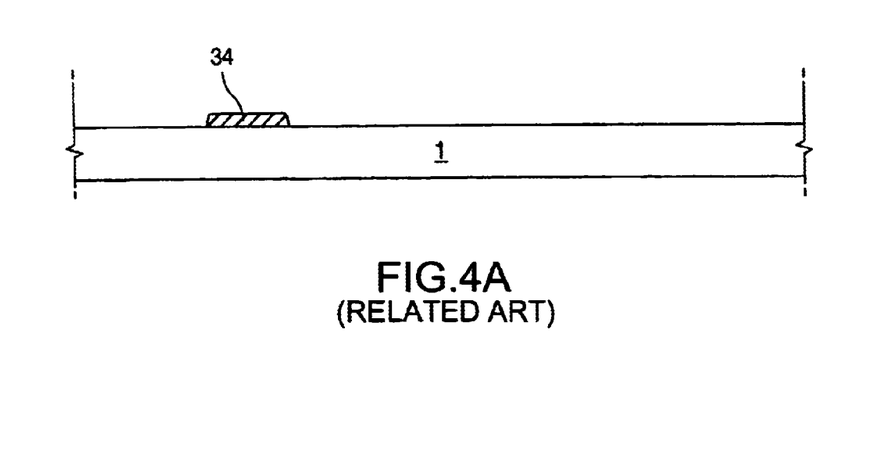
FIGS. 4A to 4G are cross sectional views taken along line IV—IV, illustrating a method of manufacturing the conventional transflective liquid crystal display device.
Figure 4B:
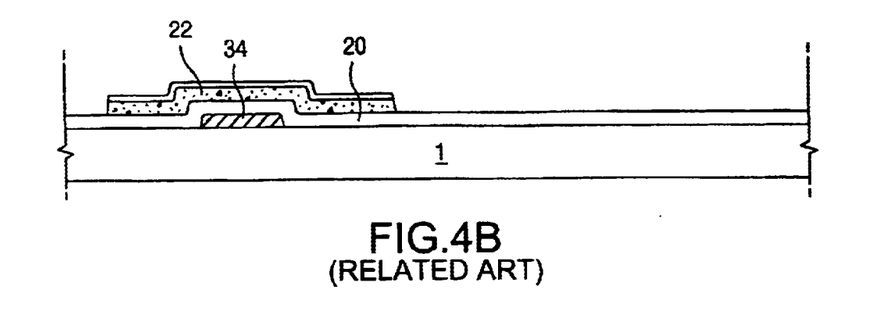
Figure 4C:
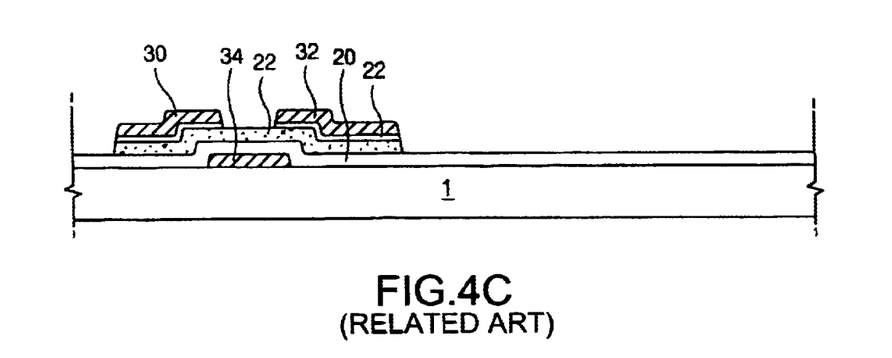
Figure 4D:
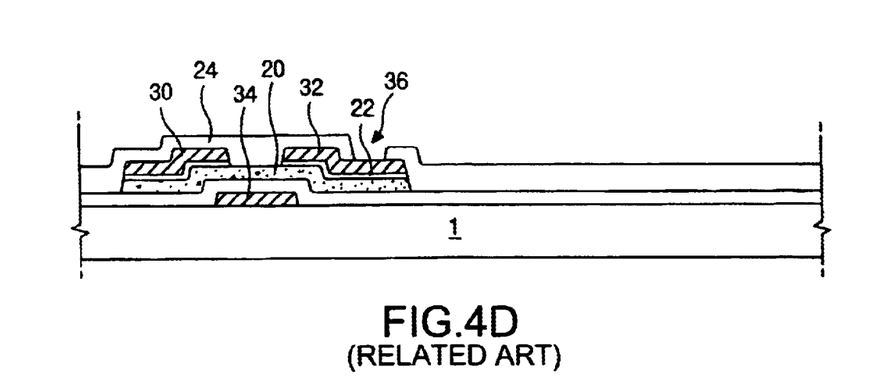
Figure 4E:
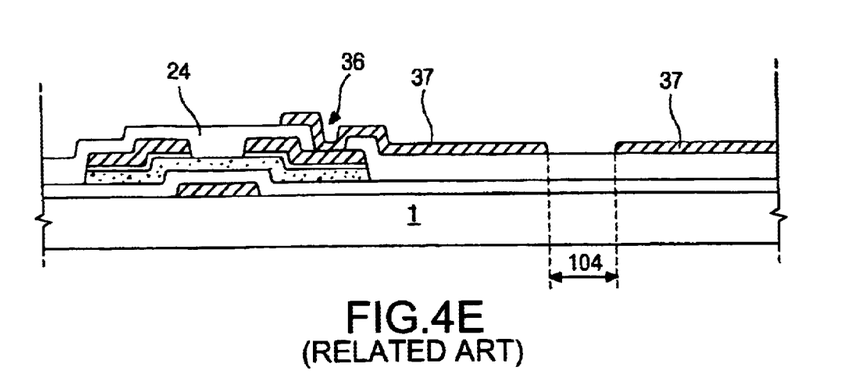
Figure 4F:
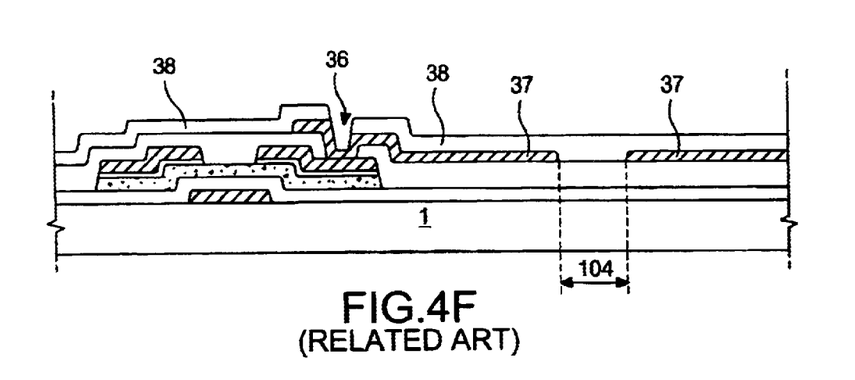
Figure 4G:
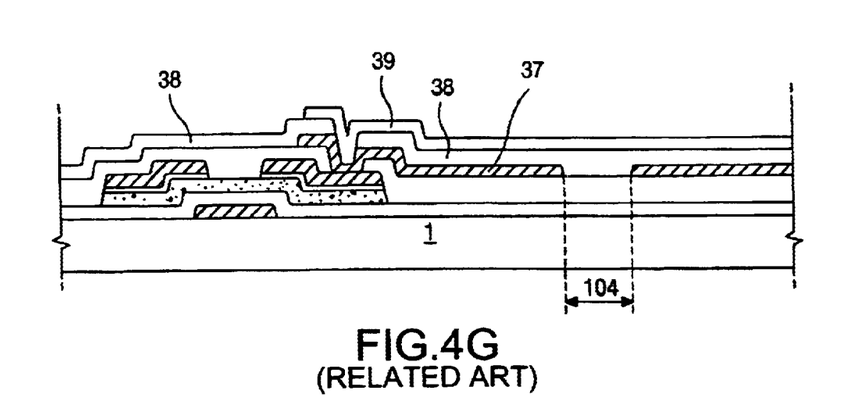

A method of manufacturing the conventional transflective LCD device is explained in detail below. FIGS. 4A through 4G are processing views illustrating a method of manufacturing the conventional transflective LCD device. As shown in FIG. 4A, a metal layer is deposited on a transparent substrate 1 and patterned into a gate electrode 34. As shown in FIG. 4B, a gate insulating layer 20 is formed on the exposed surface of the substrate 1 while covering the gate electrode 34. The semiconductor layer 22 is formed over the gate electrode 34. Sequentially, as shown in FIG. 4C, source and drain electrodes 30 and 32 spaced apart from each other are formed on the semiconductor layer 22. Then, as shown in FIG. 4D, a first passivation film 24 is formed on the exposed surface of the substrate 1 while covering the source and drain electrodes 30 and 32. A predetermined portion of the drain electrode 32 is exposed and thus a first contact hole 36 is formed. Next, as shown in FIG. 4E, an opaque conductive layer is deposited on the first passivation film 24 and patterned into a reflective electrode 37, forming a light transmitting hole 104 and contacting the drain electrode 32 through the first contact hole 36. As shown in FIG. 4F, a second passivation film 38 is formed on the exposed surface of the substrate while covering the reflective electrode 37. A second contact hole 36' is formed at a location corresponding to the first contact hole 36. Finally, as shownn in FIG. 4G, a transparent conductive layer is deposited on the whole surface of the substrate 1 and patterned into a pixel electrode 39, contacting the reflective electrode 37 through the second contact hole 36'. Therefore, most of the important components of the conventional transflective LCD device are completed. At this point, the step of depositing the second passivation film 38 is optional, and therefore the second passivation film 38 may be not formed so that the pixel electrode 39 may contact the reflective electrode 37 directly. However, when the step of depositing the second passivation film 38 is omitted, a line defect such as a line open of the reflective electrode 37 may occur due to an etchant during patterning the transparent conductive layer into the pixel electrode 39.

As described above, the method of manufacturing the conventional transflective LCD device is very complex and thus requires a lengthy processing time. In order to reduce the number of the processes, if the step of forming the second passivation film 38 is omitted, as described above, there comes a problem that a line defect such as a line open of the reflective electrode 37 may occur due to an etchant during patterning the transparent conductive layer into the pixel electrode 39. Therefore, the conventional method of the transflective LCD device leads to a low production yield.

For the foregoing reasons, there is a need for a method of manufacturing a transflective LCD device by a simple process.

SUMMARY OF THE INVENTION

To overcome the problems described above, preferred embodiments of the present invention provide a transflective liquid crystal display device which can be manufactured with a high production yield by a simple process and a method of manufacturing the same.

The preferred embodiments of the present invention provide a transflective LCD device having a good resolution.

In order to achieve the above object, a transflectuive liquid crystal display device according to a preferred embodiment of the present invention includes a first transparent substrate and a second transparent substrate. The second substrate has a color filter and spaced apart from the first transparent substrate. The transflective liquid crystal display device further includes a liquid crystal layer interposed between the first and second transparent substrate and a gate electrode arranged on the first transparent substrate. The transflective liquid crystal display device further includes a reflective electrode arranged on the transparent substrate and spaced apart from the gate electrode The reflective electrode has a light transmitting hole. The light transmitting hole transmits light. The transflective liquid crystal display device further includes a first insulating layer arranged on the first transparent substrate while covering the gate electrode and the reflective electrode and a semiconductor layer having first and second ends and being arranged over the gate electrode. The transflective liquid crystal display device further includes a source electrode and a drain electrode. The source electrode overlaps the first end portion of the semiconductor layer and the drain electrode is spaced apart from the source electrode, overlapping the second end portion of the semiconductor. The transflective liquid crystal display device further includes a second insulating layer. The second insulating layer covers the source and drain electrodes and has a first contact hole located on a predetermined portion of the drain electrode. The transflective liquid crystal display device further includes a transparent electrode. The transparent electrode is arranged over the reflective electrode and contacts the drain electrode through the first contact hole and covers a portion of the second insulating layer corresponding to the light transmitting hole. The transflective liquid crystal display device further includes a backlight device. The backlight device supplies light toward the light transmitting hole.

The gate electrode and the reflective electrode are made of the same material. The reflective electrode is made of an opaque material. The transparent electrode is a pixel electrode. The pixel electrode is made of one of indium tin oxide and indium zinc oxide. The first and second insulating layer have a second contact hole on a predetermined portion of the reflective electrode so that the pixel electrode electrically contacts the reflective electrode through the second contact hole. The light transmitting hole is located on a central portion of the reflective electrode. The light transmitting hole has one of a circular shape and a rectangular shape. The transflective liquid crystal display device further includes lower and upper polarizers. The lower polarizer is arranged between the first transparent substrate and the backlight device, and the upper polarizer is arranged on the second transparent substrate.

In another aspect, a transparent liquid crystal display device according to the preferred embodiment of the present invention includes first and second gate lines spaced apart from each other and arranged in a transverse direction and first and second data lines spaced apart from each other and arranged in a longitudinal direction perpendicular to the gate lines. The transflective liquid crystal display device further includes a thin film transistor arranged near the cross point of the first gate line and the first gate line. The thin film transistor has a gate electrode, a source electrode and a drain electrode. The gate electrode is extended from the first gate line, and the source electrode is extended from the first data line. The transflective liquid crystal display device further includes a reflective electrode. The reflective electrode extends from the second gate line and has a light transmitting hole. The light transmitting hole transmits light. The transflective liquid crystal display device further includes a pixel electrode. The pixel electrode is electrically connected with the drain electrode and covers the light transmitting hole. The transflective liquid crystal display device further includes an insulating layer. The insulating layer is arranged between the reflective electrode and the pixel electrode.

The gate line and the reflective electrode are made of the same material. The reflective electrode is located in the form of an island on a central portion of a region defined by the gate and data lines, and the light transmitting hole surrounds the reflective electrode.

In another aspect, a method of manufacturing a transflective liquid crystal display device according to the preferred embodiment of the present invention includes depositing a metal layer on a transparent substrate; patterning the metal layer into a gate electrode and a reflective electrode, the gate electrode and the reflective electrode spaced apart from each other, the reflective electrode having a light transmitting hole, the light transmitting hole transmitting light; forming a first insulating layer on an exposed surface of the transparent substrate and covering the gate electrode and the reflective electrode; forming a semiconductor layer over the gate electrode; forming source and drain electrodes, the source and drain electrodes spaced apart from each other, the source electrode overlapping a first end portion of the semiconductor layer, the drain electrode overlapping a second end portion of the semiconductor layer; forming a second insulating layer over the whole surface of the transparent substrate and covering the source and drain electrode; and forming a first contact hole on a predetermined portion of the drain electrode; forming a pixel electrode covering a portion of the first insulating layer corresponding to the light transmitting hole, the pixel electrode containing the drain electrode through the first contact hole.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 5:
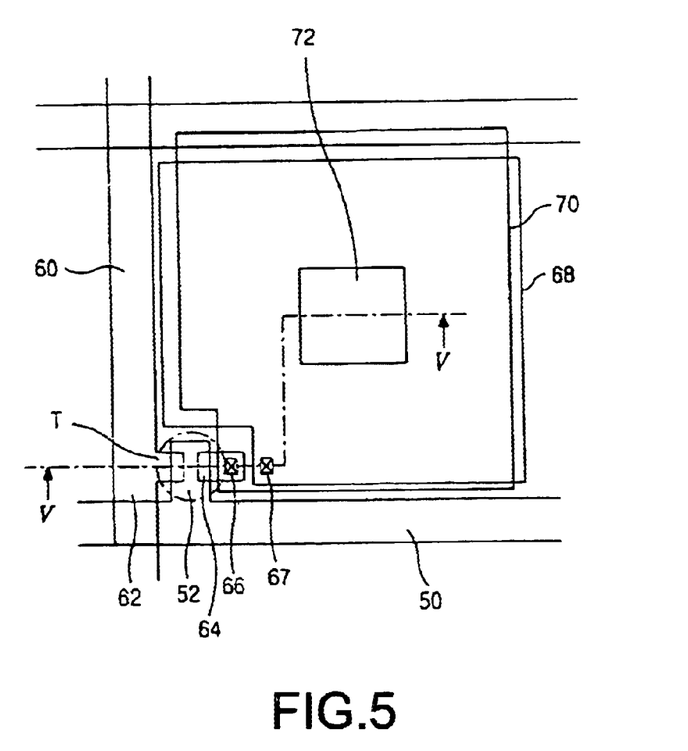
FIG. 5 is a plan view illustrating a transflective liquid crystal display device according to a preferred embodiment of the present invention.

FIG. 5 shows a transflective LCD device according to a preferred embodiment of the present invention. As shown in FIG. 5, the transflective LCD device includes gate lines 50 arranged in a transverse direction, data lines 60 arranged in a longitudinal direction perpendicular to the gate lines 50, thin film transistors "T" (TFTs) located near the cross points of the gate and data lines 50 and 60. Each of the TFTs "T" includes a gate electrode 52, a source electrode 62 and a drain electrode 64. The gate electrode 52 is extended from the gate line 50, and the source electrode 62 is extended from the data line 60. The transflective LCD device further includes a reflective electrode 68 and a pixel electrode 70. The pixel electrode 70 is electrically connected with the drain electrode 64 through a first contact hole 66, and the reflective electrode 68 is electrically connected with the pixel electrode 70 through a second contact hole 67. The reflective electrode 68 is made of an opaque conductive material and preferably the same material as the gate electrode 52, and the pixel electrode 70 is made of a transparent conductive material such as indium tin oxide (ITO). The reflective electrode 68 has a light transmitting hole 72 for transmitting light from a backlight device (see 102 in FIG. 8). The light transmitting hole 72 may have a circular or a rectangular shape and thus is not limited in its shape. The pixel electrode 70 has an area sufficient to cover the light transmitting hole 72.

Figure 6A:
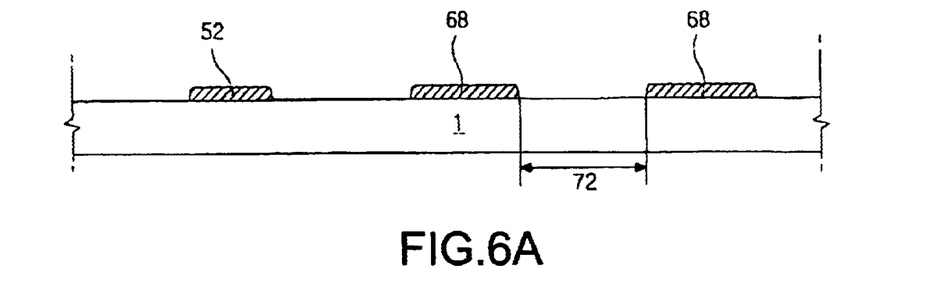
FIGS. 6A to 6D are cross sectional views taken along line V—V of FIG. 5, illustrating a process for manufacturing the transflective liquid crystal display device according to the preferred embodiment of the present invention.
Figure 6B:
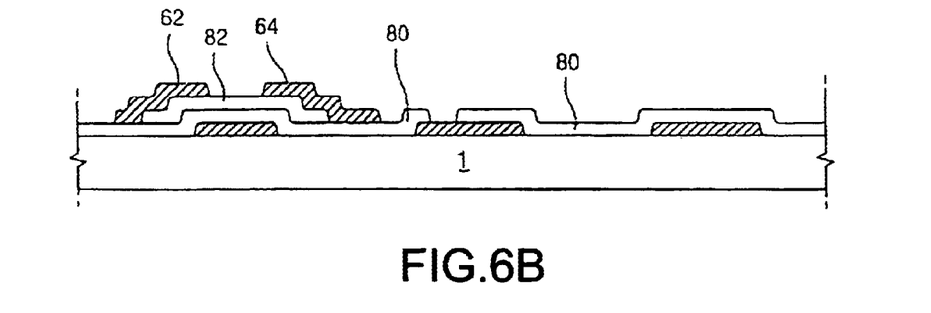
Figure 6C:
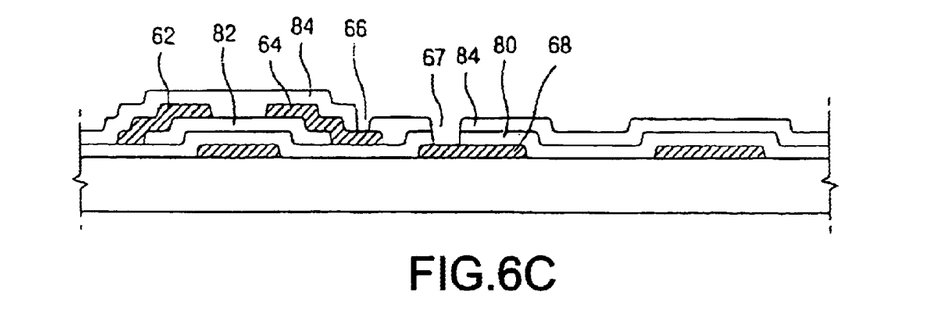
Figure 6D:
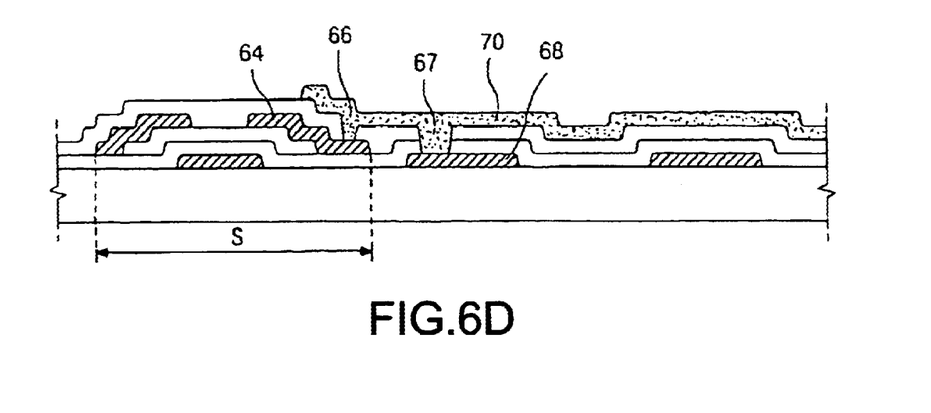

A method of manufacturing the transflective LCD device according to the preferred embodiment of the present invention is explained in detail below with reference to FIGS. 6A through 6D, which are cross-sectional views taken along line V—V, illustrating a method of manufacturing the transflective LCD device. As shown in FIG. 6A, a metal layer is deposited on a transparent substrate 1 and patterned into a gate electrode and a reflective electrode 68. The gate electrode and the reflective electrode 68 are preferably made of a metal having a high corrosion resistance such as chromium and tungsten. That is, the same mask is used to form the gate electrode 52 and the reflective electrode 68. The reflective electrode 68 has a light-transmitting hole 72 for transmitting light from the backlight device. Sequentially, as shown in FIG. 6B, a gate insulating layer 80 is formed on the exposed surface of the substrate 1 while covering the gate electrode 52 and the reflective electrode 68. A semiconductor layer 82 is formed over the gate electrode 52, and the source and drain electrodes 62 and 64 are formed, overlapping both end portions of the semiconductor layer 82, respectively. The semiconductor layer 82 has an intrinsic amorphous silicon layer and a doped amorphous silicon layer (not shown) and the source and drain electrodes 62 and 64 are spaced apart from each other. As shown in FIG. 6C, a passivation film 84 is deposited on the exposed surface of the substrate 1 while covering the source and drain electrodes 62 and 64 and patterned to form first and second contact holes 66 and 67. A predetermined portion of the drain electrode 64 is exposed for the first contact hole 66 and a predetermined portion of the reflective electrode 68 is exposed for the second contact hole 67. The passivation film 84 is made of benzocyclobutene (BCB) having a good transmittance and a high humidity resistance. Next, as shown in FIG. 6D, a transparent conductive layer is deposited on the whole surface of the substrate 1 and patterned into a pixel electrode 70, contacting the drain electrode 64 through the first contact hole 66 and the reflective electrode 68 through the second contact hole 67. The pixel electrode 79 is preferably of one of indium tin oxide (ITO) and indium zinc oxide (IZO). Therefore, most of the important components of the transflective LCD device according to the preferred embodiment of the present invention are completed. Using the method of manufacturing the transflective LCD device according to the preferred embodiment of the present invention, since the reflective electrode 68 is formed at the same time as the gate electrode 52 and thus the steps of separately forming the reflective electrode 37 (see FIG. 4E) and forming the second passivation film 38 (see FIG. 4F) can be omitted as compared with the conventional art shown in FIGS. 4A through 4G, the manufacturing process becomes simple and gets to be reduced in number, leading to a high production yield. Further, a line defect such as a line open of the reflective electrode 37 due to an etchant may be prevented.

Figure 7:
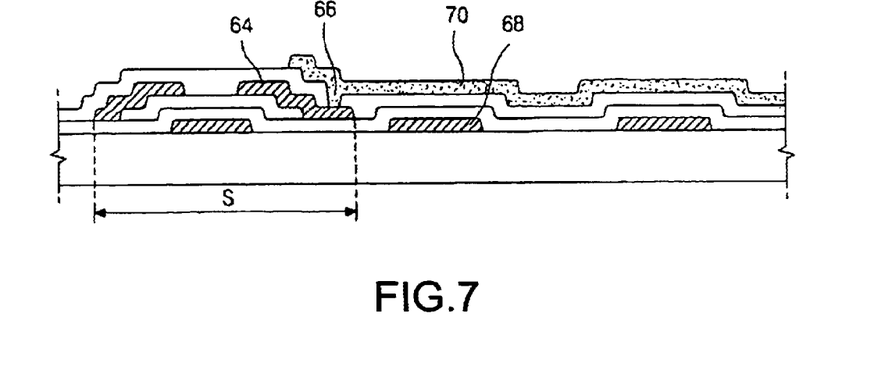
FIG. 7 is a cross sectional view illustrating a modification of the transflective liquid crystal display device according to the preferred embodiment of the present invention.

Further, the step of forming the second contact hole 67 may be omitted. In other words, as shown in FIG. 7, the pixel electrode 70 is electrically separated from the reflective electrode 68. This is because even though electrical signals from the drain electrode 64 is not conveyed to the reflective electrode 68, the transflective LCD device can be operated normally.

Figure 8:
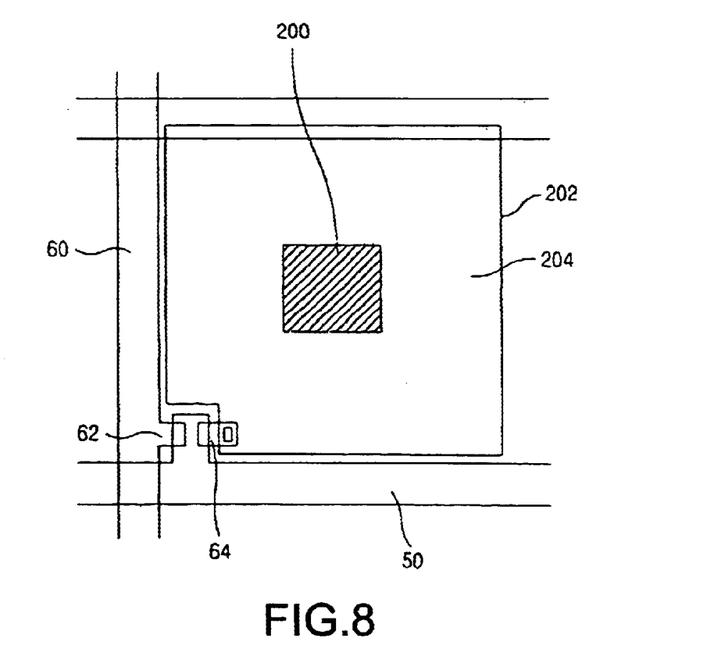
FIG. 8 is a plan view illustrating another modification of the transflective liquid crystal display device according to the preferred embodiment of the present invention.

Further, the transflective LCD device according to the preferred embodiment of the present invention can has a configuration shown in FIG. 8. In other words, the rectangular shaped reflective electrode 200 is formed in the form of an island on the central region of the pixel region, and the light transmitting hole 204 is formed surrounding the reflective electrode 200. The pixel electrode 202 has an area enough to cover the light transmitting hole 204. The contact hole (not shown) may be formed to electrically connect the pixel electrode 202 and the reflective electrode 200. Or the contact hole may be not formed.

Figure 9:
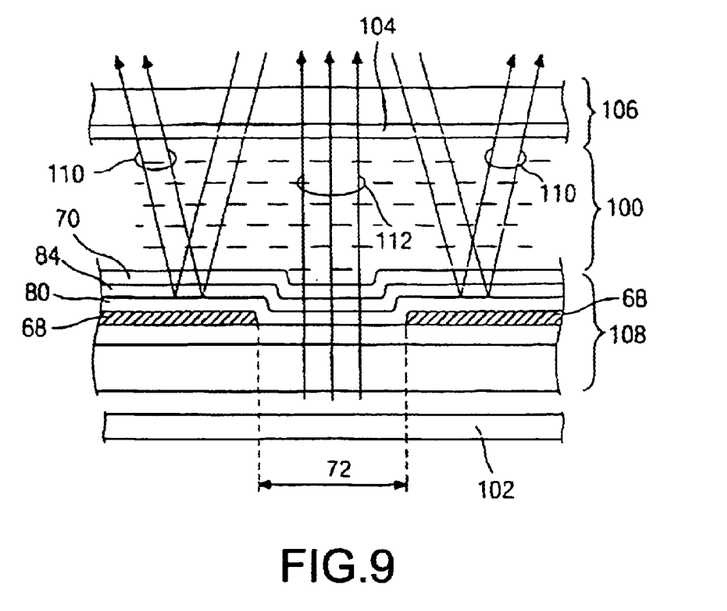
FIG. 9 is a cross sectional view illustrating a light transmitting hole of the transflective liquid crystal display device according to the preferred embodiment of the present invention.

FIG. 9 is a cross-sectional view illustrating the transflective LCD device according to the preferred embodiment of the present invention. As shown in FIG. 9, the transflective LCD device includes a liquid crystal panel and a backlight device 102. The liquid crystal display panel includes lower and upper substrates 106 and 108 with a liquid crystal layer 100 interposed therebetween. The upper substrate 106 has a color filter 104, and the lower substrate 108 has a switching element (not shown), a pixel electrode 70 and a reflective electrode 68. The reflective electrode 68 includes the light transmitting hole 72 formed therein. The pixel electrode 70 covers a region corresponding to the light transmitting hole 72. The transflective LCD device further includes an upper polarizer (not shown) on the upper substrate 106 and a lower polarizer (not shown) located between the lower substrate 108 and the backlight device 102.

The transflective LCD device according to the preferred embodiment of the present invention is operated as follows. First, in the reflective mode, the incident light 10 from the outside is reflected on the reflective electrode 68 and directs toward the upper substrate 106 again. At this time, when the electrical signals are applied to the pixel electrode 70 by the switching element (not shown), phase of the liquid crystal layer 100 varies and thus the reflected light is colored by the color filter 104 and displayed in the form of colored light.

In the transmissive mode, light 112 from the backlight device 72 passes through portions of the pixel electrode 70 corresponding to the transmitting holes 72. At this time, when the electrical signals are applied to the pixel electrode 72 by the switching element (not shown), phase of the liquid crystal layer 10 varies. Thus, the light 112 passing through the liquid crystal layer 100 is colored by the color filter 104 and displayed in the form of images with other colored lights.

In general, in order to enhance a resolution of the transflective LCD device, it is preferred that the pixel is reduced in size. However, as the pixel is reduced in size, the capacity of the storage capacitor becomes smaller. The storage capacitor serves to maintain electrical signals applied from the switching element during one frame. Therefore, there is a need for the transflective LCD device having a storage capacitor that has a capacity sufficient to maintain the electrical signals applied from the switching element during one frame.

Figure 10:
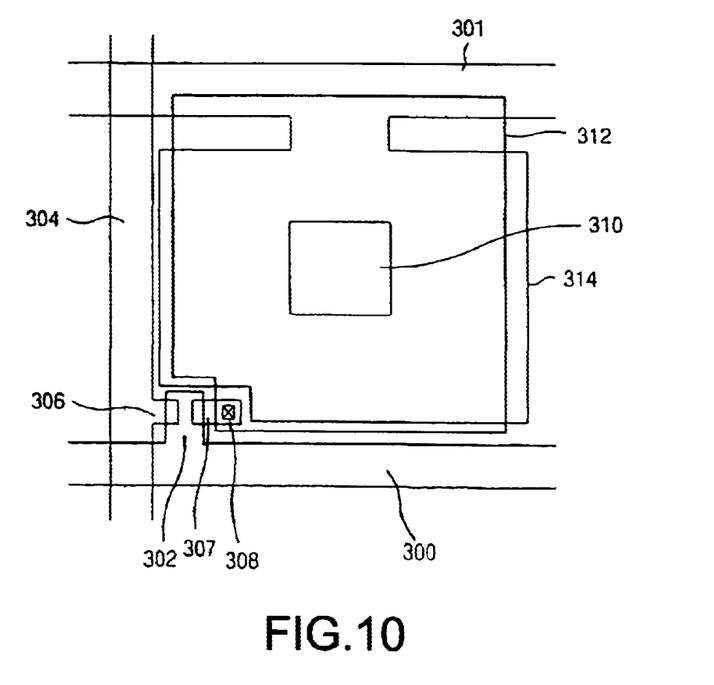
FIG. 10 is a plan view illustrating another modification of the transflective liquid crystal display device according to the present embodiment of the present invention.

FIG. 10 is a plan view illustrating the transflective LCD device having a storage capacitor according to the preferred embodiment of the present invention. As shown in FIG. 9, a reflective electrode 314 is formed at the same time as a gate line 301. In other words, the reflective electrode 314 is electrically communicated with the gate line 301, and the reflective electrode 314 and the gate line 301 are made of the same metal. Further, a pixel electrode 312 is formed over the reflective electrode 314 and is electrically connected with the drain electrode 307 through a contact hole 308. The reflective electrode 314 has a light transmitting hole 310 for transmitting light from the backlight device (see 102 FIG. 8). An insulating material (not shown) having a good transmittance is arranged between the pixel electrode 312 and the reflective electrode 314 so that the storage capacitor is formed. That is, a portion that the pixel electrode 312 overlaps the reflective electrode 314 gets to be a total area of a storage capacitor. Therefore, a capacity of the storage capacitor increase and the transflective LCD device having a good resolution can be obtained.

As described herein before, using the method of the transflective LCD device according to the preferred embodiments of the present invention, the manufacturing process becomes simple and thus the production yield increases. Further, the transflective LCD device having a good resolution can be obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transflective liquid crystal display device, comprising:
    a first transparent substrate;
    a second transparent substrate having a color filter and spaced apart from the first transparent substrate;
    a liquid crystal layer interposed between the first and second transparent substrates;
    a gate electrode arranged on the first transparent substrate;
    a reflective electrode arranged on the first transparent substrate and spaced apart from the gate electrode, the gate electrode and the reflective electrode having been formed at the same time, the reflective electrode having a light transmitting hole, the light transmitting hole transmitting light;
    a first insulating layer arranged on the first transparent substrate while covering the gate electrode and the reflective electrode;
    a semiconductor layer having first and second ends and being arranged over the gate electrode;
    a source electrode overlapping the first end portion of the semiconductor layer;
    a drain electrode spaced apart from the source electrode, overlapping the second end portion of the semiconductor, the drain electrode comprising a metallic material and being formed at an edge of a pixel region defined by a gate line and a data line;
    a second insulating layer covering the source and drain electrodes and having a first contact hole located on a predetermined portion of the drain electrode;
    a transparent electrode arranged over the reflective electrode and electrically contacting the drain electrode through the first contact hole and covering a portion of the second insulating layer corresponding to the light transmitting hole, and the first and second insulating layers have a second contact hole on a predetermined portion of the reflective electrode so that the transparent electrode electrically contacts the reflective electrode through the second contact hole; and
    a backlight device supplying light toward the light transmitting hole.

2. The transflective liquid crystal display device of claim 1, wherein the gate electrode and the reflective electrode are made of the same material.

3. The transflective liquid crystal display device of claim 1, wherein the reflective electrode is made of an opaque material.

4. The transflective liquid crystal display device of claim 1, wherein the transparent electrode is a pixel electrode.

5. The transflective liquid crystal display device of claim 4, wherein the pixel electrode is made of one of indium tin oxide and indium zinc oxide.

6. The transflective liquid crystal display device of claim 1, wherein a capacitor is formed between a portion of the transparent electrode and a portion of the reflective electrode.

7. The transflective liquid crystal display device of claim 1, wherein the light transmitting hole is located on a central portion of the reflective electrode.

8. The transflective liquid crystal display device of claim 7, wherein the light transmitting hole has one of a circular shape and a rectangular shape.

9. The transflective liquid crystal display device of claim 1, further comprising:
    lower and upper polarizers, the lower polarizer arranged between the first transparent substrate and the backlight device, the upper polarizer arranged on the second transparent substrate.

10. A transflective liquid crystal display device, comprising:
- first and second gate lines spaced apart from each other and arranged in a transverse direction;
- first and second data lines spaced apart from each other and arranged in a longitudinal direction perpendicular to the gate lines;
- a thin film transistor arranged near the cross point of the first gate line and the first data line, the thin film transistor having a gate electrode, a source electrode and a drain electrode, the gate electrode extended from the first gate line, the source electrode extended from the first data line, the drain electrode comprising a metallic material and being formed only at an edge of a pixel region defined by the gate lines and the data lines;
- a reflective electrode extending from the second gate line and having a light transmitting hole, the gate electrode and the reflective electrode having been formed at the same time, the light transmitting hole transmitting light;
- a pixel electrode electrically connected with the drain electrode through a contact hole and covering the light transmitting hole; and
- an insulating layer arranged between the reflective electrode and the pixel electrode.

11. The transflective liquid crystal display device of claim 10, wherein the gate line and the reflective electrode are made of the same material.

12. The transflective liquid crystal display device of claim 10, wherein a capacitor is formed between a portion of the pixel electrode and a portion of the reflective electrode.

13. A transflective liquid crystal display device, comprising:
- first and second gate lines spaced apart from each other and arranged in a transverse direction;
- first and second data lines spaced apart from each other and arranged in a longitudinal direction perpendicular to the gate lines;
- a thin film transistor arranged near the cross point of the first gate line and the first data line, the thin film transistor having a gate electrode, a source electrode and a drain electrode, the gate electrode extended from the first gate line, the source electrode extended from the first data line;
- a reflective electrode having a light transmitting hole, the light transmitting hole transmitting light, the gate electrode and the reflective electrode having been formed at the same time;
- a pixel electrode electrically connected with the drain electrode and covering the light transmitting hole; and
- an insulating layer arranged between the reflective electrode and the pixel electrode,
wherein the drain electrode comprises an opaque metallic material, and the drain electrode is formed at an edge of a pixel region defined by the gate lines and the data lines, and the pixel electrode is connected to the drain electrode through a contact hole in the insulating layer, and the reflective electrode is located in the form of an island on a central portion of the pixel region defined by the gate and data lines, and the light transmitting hole surrounds the reflective electrode, and the insulating layer has a second contact hole on a predetermined portion of the reflective electrode so that the pixel electrode electrically contacts the reflective electrode through the second contact hole.

14. A method of manufacturing a transflective liquid crystal display device, comprising:
- depositing a metal layer on a transparent substrate;
- patterning the metal layer into a gate electrode and a reflective electrode, the gate electrode and the reflective electrode spaced apart from each other, the reflective electrode having a light transmitting hole, the gate electrode and the reflective electrode having been formed at the same time, the light transmitting hole transmitting light;
- forming a first insulating layer on an exposed surface of the transparent substrate and covering the gate electrode and the reflective electrode;
- forming a semiconductor layer over the gate electrode;
- forming source and drain electrodes, the source and drain electrodes spaced apart from each other, the source electrode overlapping a first end portion of the semiconductor layer, the drain electrode overlapping a second end portion of the semiconductor layer, the drain electrode comprising a metallic material and being formed at an edge of a pixel region defined by a gate line and a data line;
- forming a second insulating layer over the whole surface of the transparent substrate and covering the source and drain electrode;
- forming a first contact hole on a predetermined portion of the drain electrode;
- forming a second contact hole on a predetermined portion of the reflective electrode; and
- forming a pixel electrode covering a portion of the first insulating layer corresponding to the light transmitting hole, the pixel electrode electrically contacting the drain electrode through the first contact hole and the pixel electrode contacting the reflective electrode through the second contact hole.

15. The transflective liquid crystal display device of claim 14, wherein a capacitor is formed between a portion of the pixel electrode and a portion of the reflective electrode.

* * * * *